March 15, 1949.  K. C. BURROUGHS  2,464,485
OPTICAL VIEWING INSTRUMENT, INCLUDING
A COLLIMATING SIGHT FOR USE IN
HARMONIZING GUNS AND SIGHTS
Filed July 9, 1946  2 Sheets-Sheet 1
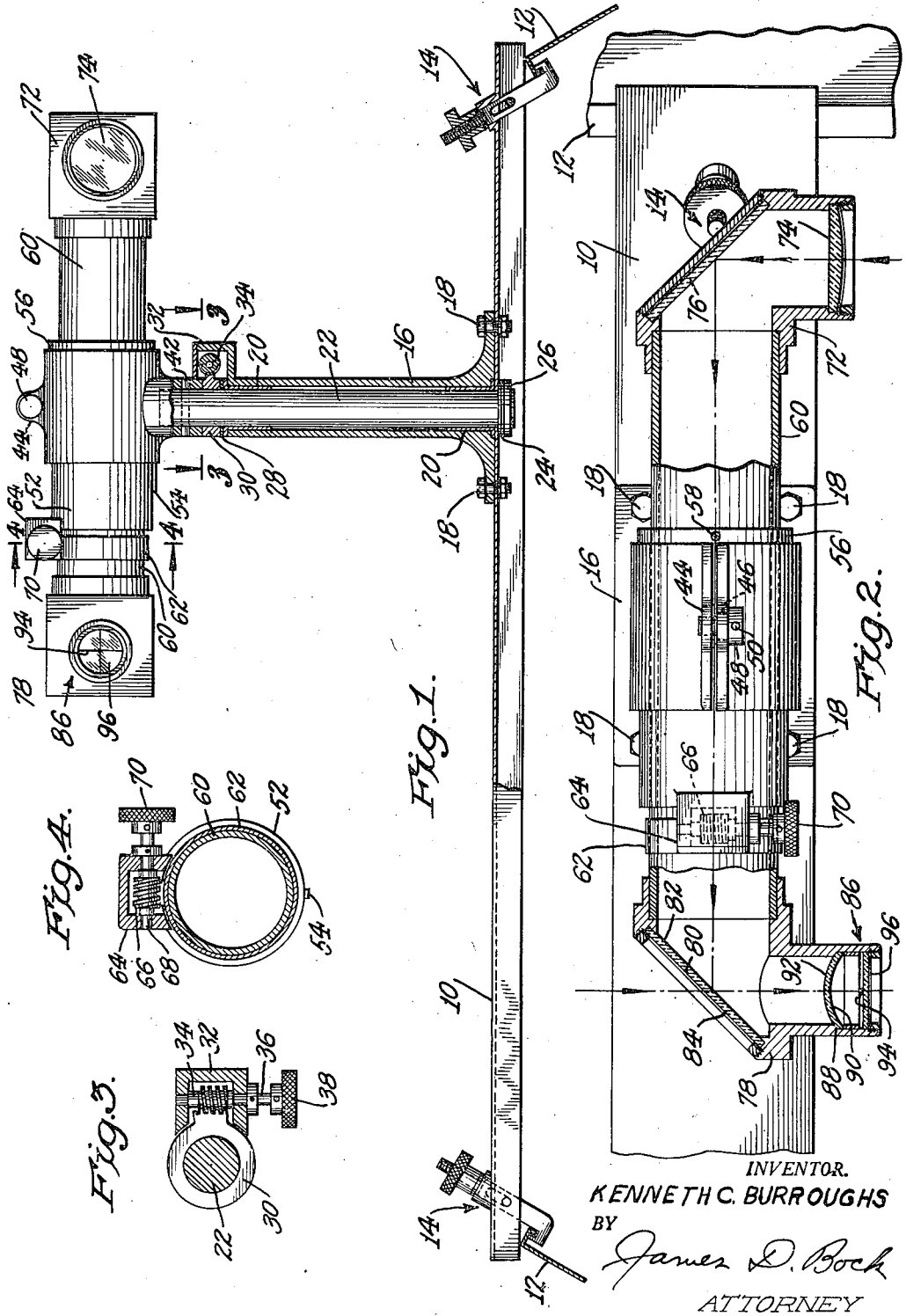
INVENTOR.
KENNETH C. BURROUGHS
BY
James D. Bock
ATTORNEY March 15, 1949. K. C. BURROUGHS 2,464,485
OPTICAL VIEWING INSTRUMENT, INCLUDING
A COLLIMATING SIGHT FOR USE IN
HARMONIZING GUNS AND SIGHTS
Filed July 9, 1946 2 Sheets-Sheet 2
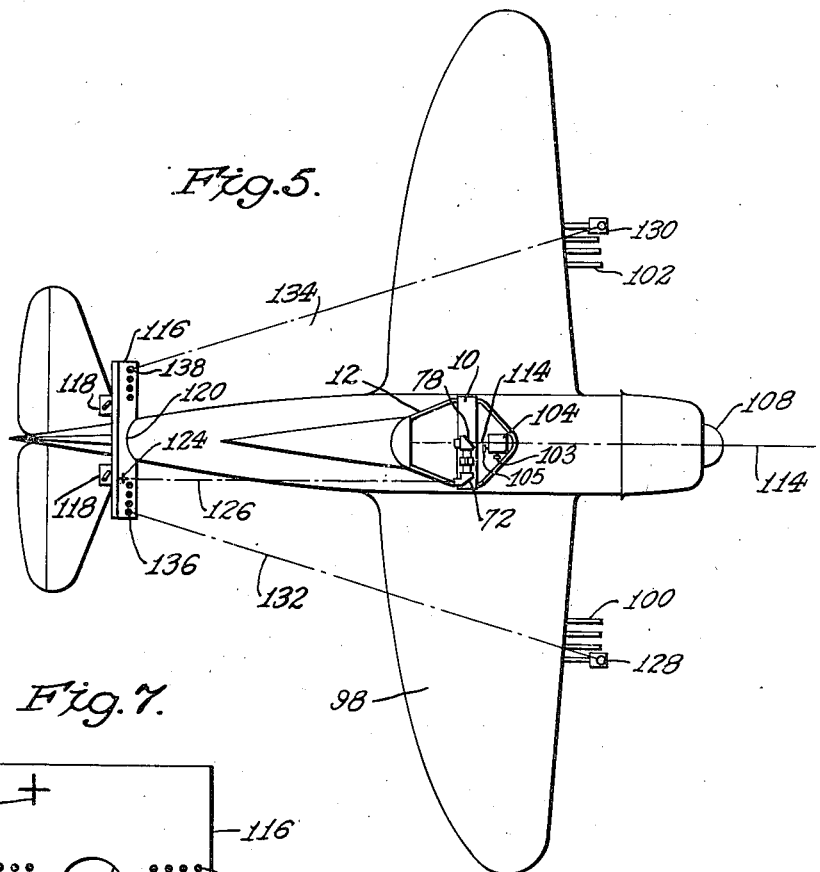
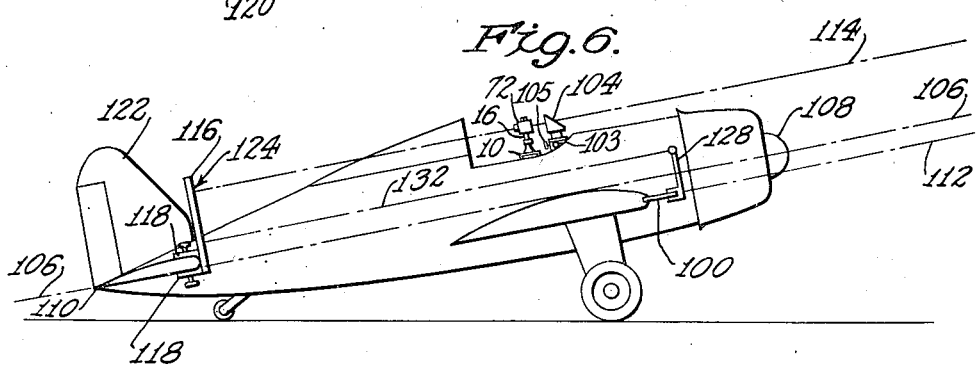
INVENTOR.
KENNETH C. BURROUGHS
BY
James D. Bock
ATTORNEY Patented Mar. 15, 1949

2,464,485

UNITED STATES PATENT OFFICE 2,464,485

OPTICAL VIEWING INSTRUMENT, INCLUDING A COLLIMATING SIGHT FOR USE IN HARMONIZING GUNS AND SIGHTS

Kenneth C. Burroughs, Scarsdale, N. Y., assignor to American Cystoscope Makers, Inc., New York, N. Y., a corporation of New York Application July 9, 1946, Serial No. 682,271

5 Claims. (Cl. 88—1)

The present invention relates to an optical instrument and more particularly to an optical instrument useful in the harmonizing of aircraft guns and sights.

The present invention and the use thereof will be described in connection with the harmonizing of the sight and the guns on a fighter type of aircraft in which a plurality of guns is mounted in each of the wings and the sight is mounted in a suitable position forward of the pilot's cockpit. In such installations the guns are usually individually mounted in fixed but adjustable positions within the wings with the muzzles thereof opening into the leading edges of the wings. Thus for any given adjustment of each gun a line through the bore thereof will bear a fixed relationship to a reference line extending generally fore and aft of the aircraft. Such reference line is established by means of a sight positioned for use by the pilot who so directs the aircraft as to bring the sight upon a target. Obviously the guns must be so adjusted as to converge in desired pattern upon a target at a predetermined range when such target is in the line of sight.

The sight used in aircraft of this type is usually a reflex sight in which an image of a reticle is projected by a self-contained light source upon a surface of a transparent or semi-transparent element through which the pilot may look while operating the aircraft. The image is so formed in the projecting system of the sight as to appear on the element as if it were at infinity. The line of sight thus established is generally fore and aft of the aircraft and parallel to the plane of flight thereof but need not be precisely so.

Harmonizing of the guns and sight has been effected by bringing the aircraft into an attitude of level flight, which includes jacking up the tail of many types of aircraft, and shifting the aircraft about to bring the sight upon a target board positioned at a substantial distance ahead of the aircraft. This operation is slow and tedious inasmuch as the reticle in the sight must be made to coincide with a figure, such as crossed lines upon the target board. The guns are then boresighted upon the target board for the desired convergence and elevation at the range represented by the distance from the aircraft to the target board.

Various proposals have been made of procedures for harmonizing the guns and sights while the aircraft is in a parked attitude in any location in which it may be parked. Fundamentally these proposals usually call for the positioning on some part of the aircraft of a target board and the provision of means such as periscopes and the like to boresight the guns thereon in desired pattern. The present invention provides a reliable and rugged optical instrument for bringing the sight upon such a target in a simple and rapid manner and with extreme accuracy.

Broadly speaking the optical instrument of the present invention establishes highly accurately parallel lines of sight extending forwardly and rearwardly of an operator and the instrument is capable of use in any relationship where such characteristics may be required. Thus the instrument of the present invention is useful in such activities as surveying as well as in the particular relationship in which it will be described herein.

It is therefore an object of the present invention to provide an optical instrument of the type discussed above.

It is a further object of the present invention to provide an optical instrument in which an operator may sight simultaneously upon an object behind him and an object ahead of him.

It is a further object of the present invention to provide means for harmonizing the guns and sights of aircraft including an optical instrument which may be sighted upon a target secured to the empennage of the aircraft to form an image of such target at infinity and apparently ahead of the aircraft, on which image the aircraft sight may be brought by adjustment thereof relative to the aircraft and on which target the guns may be boresighted by the use of suitable periscopic or other apparatus.

Other and further objects of the present invention in part will be obvious and in part will become apparent upon consideration of the following detailed description of a preferred, but not necessarily the only, form of the invention taken in connection with the drawings accompanying and forming a part of the present specification.

In the drawings:

Fig. 1 is an elevational view with parts in section of apparatus embodying the present invention;

Fig. 2 is an enlarged top plan view of a portion of the apparatus shown in Fig. 1;

Fig. 3 is a sectional view taken along the line 3—3 of Fig. 1;

Fig. 4 is a sectional view taken along the line 4—4 of Fig. 1;

Fig. 5 is a top plan view of a parked aircraft having the apparatus of the present invention attached thereto;

Fig. 6 is a side elevational view of the aircraft shown in Fig. 5; and

Fig. 7 is a somewhat diagrammatic view of a target board which may be used in connection with the present invention.

Referring now to the drawings, 10 indicates a base plate which is adapted to rest across the cockpit 12 of an aircraft (see Figs. 1 and 5) and to be secured temporarily thereto as by adjustable clamps 14. As shown in Fig. 1, a standard 16 is secured as by bolts 18 to the base plate 10. The standard 16 is provided with bushings 20 which receive a rotatable shaft 22 fitted at its lower end with thrust washers 24 and a friction nut 26. At the upper end of the standard 16 a thrust washer 28 rests upon the bushing 20 and in turn supports a segmental worm wheel 30 fixed to the shaft 22 (see Fig. 3).

A housing 32 is formed on the standard 16 and encloses a worm 34 fixed to a shaft 36 rotatably mounted in the housing and having a knurled knot 38 secured to the outer end thereof. Rotation of the knot 38 will produce limited rotation of the shaft 22 about a vertical axis.

The shaft 22 carries at its upper end a sleeve holder 40 pinned to the shaft 22 by a pin 42. The sleeve holder is split as shown in Fig. 2 and is provided with a threaded lug 44 on one half and an unthreaded lug 46 on the other half. A screw 48 is inserted through the lug 46 and threaded into the lug 44 whereby the halves of the sleeve holder may be drawn together when so desired. As shown in the drawings the screw 48 may be provided with tool openings 50 to receive a suitable lever or spanner not shown.

A sleeve 52 is positioned within the sleeve holder 40 and provided with a key 54 cooperating with a suitable key way in the sleeve holder to prevent rotation of the sleeve 52 within the holder while permitting longitudinal adjustment between the sleeve 52 and sleeve holder 40 upon loosening of the screw 48. A retainer ring 56 may be secured as by a set screw 58 adjacent the right hand end of the sleeve 52 as viewed in Fig. 1.

A body tube 60 is mounted for rotation within the sleeve 52 and is provided with a segmental worm wheel 62 as shown in Fig. 4. The segmental worm wheel 62 may be constructed in one or more parts but consists essentially of a strap or band secured to the exterior surface of the body tube 60 and a few teeth. The sleeve 52 has formed on it a housing 64 within which is positioned a worm 66 fixed to a shaft 68 having a knurled knob 70 fixed thereto outside the housing 64. The worm 66 may be rotated by means of the knob 70 to cause limited rotation of the body tube 60 within the sleeve 52.

The mechanism thus far described provides for rotation of the body tube 60 about the generally vertical axis of the shaft 22 and for rotation about the generally horizontal axis of the body tube. The knobs 38 and 70 may thus be manipulated to adjust the instrument for azimuth and elevation respectively. The specific details of the mounting and adjusting means for the body tube 60 may be modified in many ways and the detailed disclosure herein made is not intended to limit the scope of the invention since it is essential only that the instrument be rigidly supported and capable of accurate adjustments of the type described.

As shown in Fig. 2 the right-hand end of the body tube 60 has secured thereto a housing 72 in which is mounted an objective lens 74 and a first surface reflector 76. The optical axis of the objective 74 is disposed at an angle of 90° to the axis of the body tube 60 and the surface of reflector 76 is disposed at an angle of 45° to the axis of the objective 74. In a horizontal plane as viewed in Fig. 2 the surface of reflector 76 is disposed at an angle of 45° to the axis of the body tube 60 while in a vertical plane said surface is disposed at an angle of 90° to said axis. Thus light collimated by the objective 74 will be bent through 90° in a horizontal plane by the reflector 76 and will be transmitted through the body tube 60.

At the left-hand end of the body tube 60 there is secured a housing 78 having a half-silvered first surface reflector 80 mounted therein at an angle of 45° in the horizontal plane and 90° in the vertical plane to the axis of the body tube 60. Light transmitted through the body tube 60 will be bent through 90° in the horizontal plane by the half-silvered reflector 80 and thus transmitted in the same horizontal plane as the light entering the objective 74 and parallel thereto but in an opposite direction.

The body of the half-silvered reflector 80 is made of glass or other suitable transparent material. A semi-transparent reflecting surface 82 may be formed by lightly metalizing the body or coating the body 80 with a material having an index of refraction substantially higher than that of the glass or other transparent material from which the body of the reflector is made. The half-silvered reflector 80 therefore will not only reflect light passing through to body tube 60 but also will transmit light falling upon the rear or exterior surface 84 thereof.

The housing 78 also carries a collimating eyepiece indicated generally at 86, the optical axis of which is parallel to the optical axis of the objective 74. The optical axis of the eyepiece 86 is preferably established in the following manner: A meniscus having a transparent body 88 and a half-silvered reflecting surface 90 on the concave side is positioned in the eyepiece. The rear surface 92 of the meniscus may be untreated, if so desired, or treated with suitable material to reduce surface reflection. The meniscus 88 therefore will transmit light falling upon the surface 92 and also will reflect light falling upon the concave half-silvered surface 90. The latter surface is preferably spherical and the meniscus itself preferably has no power.

A reticle 94 is accurately and fixedly mounted in the plane of principal focus of the spherical reflecting surface 90. As shown in the drawings the reticle 94 may comprise vertical and horizontal intersecting lines formed on the inner surface of a transparent body 96 preferably having plane parallel surfaces so as to have no power. Preferably the reticle pattern is formed of a highly reflective material having a reflecting surface facing the spherical semi-transparent reflecting surface 90. Light entering the instrument through objective 74 or through the half-silvered reflector 80 will pass freely through the meniscus 88 and the semi-transparent surface 90. Certain rays of this light will impinge upon the reflective surface of the reticle 94 and will be reflected upon the surface 90. From the surface 90 these rays will be reflected in substantially parallel axial directions, since the reticle is positioned at the principal focus of the surface 90, and a virtual image of the reticle will be formed. When a person sights through the eyepiece 86 the virtual image of the reticle 94 will be superimposed upon the field of vision at infinity. In the instrument of the present invention the optical axis thus established is parallel to the optical axis of the objective 74.

It will be apparent from the above description that when the objective 74 is focused upon a target in the rear of an observer a distance equal to the focal length of the objective 74, an image thereof may be observed as if at infinity upon the reflector 80 and sighted through the eyepiece 86. This image will be clear and undistorted because neither the meniscus 88 nor the reticle support 96 have any power. The virtual image of the reticle 94 may be brought into coincidence with the target image by proper manipulation of azimuth and elevation knobs 38 and 70. Furthermore the observer may have clear and undistorted view through the half-silvered reflector 80 of such objects as may be generally directly ahead.

The instrument of the present invention may be used to establish a definite line ahead of the observer with reference to a point to the rear of the observer. Such line will be parallel to and offset from the line from the rear point to the center of the objective 74 by the known distance from the center of the objective to the center of the reticle in eyepiece 86. Obviously the instrument may be used in a vertical position as well as in the horizontal position shown in the drawings. The instrument is therefore useful in the field of surveying as well as in the specialized field chosen herein for illustration.

The use of the instrument of the present invention in the harmonizing of aircraft guns and sights will now be described with particular reference to Figs. 5 and 6. In said figures an aircraft 98 is shown having starboard wing guns 100, port wing guns 102 and a sight 104 of any desired type but preferably a reflex sight of the general type shown in U. S. Letters Patent 1,610,532 granted December 14, 1926 to Russell et al. The sight 104 is provided with azimuth and elevation knobs 103 and 105 which may be manipulated in a well-known manner to adjust the sight relative to the aircraft. The type of aircraft shown is one which assumes an attitude when parked markedly different from that assumed in flight. For purposes of illustration it will be assumed that when in flight all parts of the aircraft move in planes parallel to a plane indicated by the line 106 which passes through the spinner 108 and the rearmost tip 110 of the fuselage. Accordingly, the guns 100 and 102 must be adjusted for elevation relative to the plane 106. For purposes of illustration the line 112 (Fig. 6) indicates a continuation of the bore of one of the starboard guns 100. Furthermore the sight 104 must be adjusted with regard to the plane 106 in order that when in flight the aircraft may be held upon a target in the line of sight without undue difficulty. Similarly the sight 104 must be adjusted so that the line of sight extends generally fore and aft of the aircraft. For purposes of illustration the line of sight is indicated by the line 114 which extends substantially parallel to the plane 106 (Fig. 6) and substantially within a vertical plane through the center of the cockpit 12 and through the center of the spinner 108 (Fig. 5).

It is the purpose of the present invention to provide means for establishing a predetermined relationship between the line of sight 114 and the lines extending axially of the bores of the various guns. Obviously, these lines will not be likely to be parallel inasmuch as the guns must be set for elevation and for proper convergence at a particular range. When the guns and sights are harmonized, the guns may be adjusted relative to the aircraft and the sight also may be adjusted relative to the aircraft. Such procedure is, of course, necessary when the guns and sight are first positioned in the plane during manufacture and experience has shown that the guns and sight must usually be harmonized after each operation of the aircraft. With the instrument of the present invention, it is possible to harmonize the guns and the sight in any location in which the aircraft happens to be and it is obvious that this ability will result in increased efficiency and convenience in the manufacture of aircraft as well as at air bases and the like.

In the use of the present invention the instrument is placed across the cockpit of the aircraft in such position as generally to align the eyepiece 86 with the sight 104 as shown in Fig. 5. The base plate 10 is positioned across the cockpit 12 and is secured in place by proper manipulation of the clamps 14 (see Fig. 1). It will be understood that each instrument will be designed for a specific type of aircraft in order that it may be quickly positioned in proper relationship to the sight in such aircraft. Minor adjustments in position of the eyepiece relative to the sight in a horizontal plane may be made by loosening the sleeve clamp screw 50 (Fig. 2) to permit movement of the sleeve 52 within the sleeve holder 40. The screw 50 is tightened when the eyepiece is aligned with fair accuracy and final alignment of the eyepiece with the sight 104 will be effected by adjustment of the sight itself as will be more fully described herein below.

A target board 116 of suitable dimensions is secured to the aircraft preferably at as great a distance as is practicable from the cockpit. In the ordinary aircraft it is preferable to secure the target board to the empennage. In the type of aircraft chosen for illustration herein, it will be observed that the target board 116 is provided with suitable clamping devices 118 adapted to engage opposed surfaces of a stabilizer. As shown particularly in Fig. 5, the target board 116 is cut away at 120 in order that it may straddle the fuselage in a region adjacent the stabilizer 122. This particular construction of the target board provides areas thereof on either side of the fuselage at a level such as to permit convenient boresighting without the necessity for multitudinous corrections. The particular shape and size of the target board and the manner of securing the same to the aircraft forms no part of the present invention, it being understood that very wide variations will necessarily be encountered as a result of the different structures of various aircraft. The essential features of the target board are first that it be so designed as to be secured to the aircraft in a definite position and second, that it be of sufficient area to permit of boresighting of the guns thereon. The particular target board chosen for illustration herein is relatively narrow and requires a periscopic boresighting mechanism of a type which may be corrected for angular deviation between the line of sight and the axis of the bore. It is apparent that the target board might be made wide enough to extend out into direct alignment with the guns but that such board is likely to be unwieldly and difficult to handle.

The target board 116 is provided with a figure of suitable shape upon which the instrument of the present invention may be sighted. For purposes of illustration intersecting horizontal and vertical lines may be provided as shown at 124 in Fig. 7. This particular figure is particularly appropriate if the reticle 94 consists of horizontal and vertical lines intersecting as shown in Fig. 1. The figure 124 is preferably so positioned on the target board 116 that the horizontal line thereof lies substantially within a plane parallel to the plane 106 and extending through the sight 104. The vertical line of the figure 124 is preferably offset from a vertical plane passing through the sight 104 by a distance equal to that between the axis of objective 74 and the axis of eyepiece 86. It is apparent from the foregoing that the target board 116 must be especially designed for the type of aircraft with which it is to be used. Furthermore, as has been stated above, the focal length of objective 74 must be equal to the distance between the objective and the figure 124.

The operator enters the cockpit and manipulates the azimuth and elevation knobs of the instrument to bring the image of reticle 94 into coincidence with the image of the figure 124. This operation brings the optical axis of the eyepiece 86 into accurate parallelism with a line 126 (Fig. 5) which extends from the figure 124 to the center of objective 74. The operator then adjusts the usual azimuth and elevation knobs 103 and 105 of the sight 104 to bring the reticle image therein as seen through the eyepiece 86 into coincidence with the images of reticle 94 and figure 124. The line of sight of the sight 104 then bears a definite relation to the figure 124 and thereafter the figure 124 may be used as a reference point for boresighting the guns.

Any suitable method and/or apparatus may be used for boresighting the guns on the target board 116 to bring them into desired elevation and convergence. For purposes of illustration it has been assumed that the guns will be boresighted by periscopic devices known to the art. A device of this type is indicated at 128 in position upon one of the starboard guns and at 130 on one of the port guns. It will be understood that the devices 128 and 130 are so constructed that an operator may in effect peer through the bore of the gun and along an angularly disposed line of sight 132 or 134. Other periscopic devices are so constructed as to project a narrow beam of light through the bore and along the path indicated by the lines 132 or 134 to form a spot of light upon the target board. In either event the guns are individually spotted on the target board 116; for example, the starboard guns may be spotted on the spots 136 and the port guns on the spots 138.

The disposition of the spots 136 and 138 relative to the figure 124 will be so predetermined as to bring the guns into proper elevation and convergence for an actual target at a particular range when the aircraft is so directed as to bring the sight 104 upon such target.

In the above detailed description of a preferred form of apparatus and an illustrative method of employing such apparatus, it will be understood that the terms used are intended to be descriptive rather than limiting in sense and that modifications and variations may be resorted to by those skilled in the art within the scope of the appended claims.

I claim:

1. For use with an aircraft having wing guns and a reflex sight, an optical viewing instrument for facilitating adjustment of said sight relative to a target board fixed to the empennage of said aircraft and upon which the wing guns may be boresighted; said optical instrument including an ocular, a reticle, means for forming an image of said reticle at a great apparent distance within the field of view of said ocular to establish an axis for said ocular, a diagonal semi-transparent reflector in the field of view of said ocular, and means including an objective for forming at a great apparent distance upon said reflector an image of an object on said target board, the axis of said objective being spaced from and parallel to the axis of said ocular; and means for mounting said optical instrument within the cockpit of the aircraft in such position that said reflex sight may be viewed directly through said ocular and said objective is directed rearwardly of said aircraft toward said target board, said mounting means including means for adjusting said optical instrument relative to said aircraft to bring the axis of said ocular into predetermined position relative to the object on said target board.

2. For use with an aircraft having wing guns and a reflex sight, an optical viewing instrument for facilitating adjustment of said sight relative to a target board fixed to the empennage of said aircraft and upon which the wing guns may be bore-sighted; said optical instrument including a housing, an ocular within said housing, a reticle, means for forming an image of said reticle at infinity within the field of view of said ocular to establish an axis for said ocular, an objective mounted within said housing the axis of said objective being parallel to the axis of said ocular, a diagonally disposed plane reflector positioned within said housing and intersecting the axis of said objective, a diagonally disposed plane semi-transparent reflector positioned within said housing and intersecting the axis of said ocular, said reflector and said semi-transparent reflector being effective to direct light from said objective to said ocular, and means defining an opening in said housing in alignment with said ocular and said semi-transparent reflector; a support adapted to be secured in fixed position within the cockpit of an aircraft; and adjustable mounting means carried by said support and adapted to position said optical instrument in such manner that the field of view of said objective is directed rearwardly of the aircraft toward the target board on the empennage thereof, and the field of view of said ocular through said semi-transparent reflector and said opening is directed forwardly of said aircraft to permit viewing the reflex sight, said adjustable mounting means being adapted to so adjust the position of said housing as to bring an image of a selected object on said target board upon said semi-transparent reflector and into coincidence with the image of said reticle whereby adjustment of said reflex sight may be made to bring the line of sight thereof into coincidence with the axis of said ocular and thus parallel with the line of sight from the optical center of said objective to said object on said target board.

3. For use with an aircraft having wing guns and a reflex sight, an optical viewing instrument for facilitating adjustment of said sight relative to a target board fixed to the empennage of said aircraft and upon which the wing guns may be bore-sighted; said optical instrument including an ocular having a reticle, means for forming an image of said reticle at a great apparent distance within the field of view of said ocular to establish an axis for said ocular, a diagonal semi-transparent reflector in the field of view of said ocular, and means including an objective for forming at a great apparent distance upon said reflector an image of an object on said target board, the axis of said objective being spaced from and occupying a definite position with respect to the axis of said ocular; and means for mounting said optical instrument within the cockpit of the aircraft in such position that said reflex sight may be viewed directly through said ocular and said objective is directed rearwardly of said aircraft toward said target board, said mounting means including means for adjusting said optical instrument relative to said aircraft to bring the axis of said ocular into predetermined position relative to the object on said target board.

4. For use with an aircraft having wing guns and a reflex sight, an optical viewing instrument for facilitating adjustment of said sight relative to a target board fixed to said aircraft at a point remote from said sight and upon which the wing guns may be bore-sighted; said optical instrument including an ocular, a reticle, means for forming an image of said reticle at a great apparent distance within the field of view of said ocular to establish an axis for said ocular, a diagonal semi-transparent reflector in the field of view of said ocular, and means including an objective for forming at a great apparent distance upon said reflector an image of an object on said target board, the axis of said objective being spaced from and parallel to the axis of said ocular; and means for mounting said optical instrument within the cockpit of the aircraft in such position that said reflex sight may be viewed directly through said ocular and said objective is directed toward said target board, said mounting means including means for adjusting said optical instrument relative to said aircraft to bring the axis of said ocular into predetermined position relative to the object on said target board.

5. For use with an aircraft having wing guns and a reflex sight, an optical viewing instrument for facilitating adjustment of said sight relative to a target board fixed to the rearward portion of said aircraft at a point remote from said sight and upon which the wing guns may be bore-sighted; said optical instrument including an ocular, a reticle, means for forming an image of said reticle at a great apparent distance within the field of view of said ocular to establish an axis for said ocular, a diagonal semi-transparent reflector in the field of view of said ocular, and means including an objective for forming at a great apparent distance upon said reflector an image of an object on said target board, the axis of said objective occupying a definite position within a plane parallel to the axis of said ocular; and means for mounting said optical instrument within the cockpit of the aircraft in such position that said reflex sight may be viewed directly through said ocular and said objective is directed rearwardly of said aircraft toward said target board, said mounting means including means for adjusting said optical instrument relative to said aircraft to bring the axis of said ocular into predetermined position relative to the object on said target board.

KENNETH C. BURROUGHS.

REFERENCES CITED

The following references are of record in the file of this patent:

UNITED STATES PATENTS

| Number | Name | Date |
|---|---|---|
| 683,203 | Grubb | Sept. 24, 1901 |
| 714,276 | Blish | Nov. 25, 1902 |
| 725,839 | Grubb | Apr. 21, 1903 |
| 835,625 | Konig | Nov. 13, 1906 |
| 854,310 | Robertson | May 21, 1907 |
| 1,339,006 | Sperry | May 4, 1920 |
| 1,985,067 | Wandersleb | Dec. 18, 1934 |
| 2,353,272 | Simmons et al. | July 11, 1944 |